(12) United States Patent
Sugiyama et al.

(10) Patent No.: US 8,511,421 B1
(45) Date of Patent: Aug. 20, 2013

(54) ACOUSTIC SOURCES

(75) Inventors: Hitoshi Sugiyama, Sagamihara (JP);
Wataru Izuhara, Inagi (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/569,115

(22) Filed: Aug. 7, 2012

(51) Int. Cl.
*G01V 1/40* (2006.01)

(52) U.S. Cl.
USPC .......................................... 181/106; 181/121

(58) Field of Classification Search
USPC ................................................ 181/121, 106
See application file for complete search history.

(56) References Cited

U.S. PATENT DOCUMENTS

| | | | | |
|---|---|---|---|---|
| 4,700,803 A * | 10/1987 | Mallett et al. | | 181/106 |
| 4,751,688 A * | 6/1988 | Paulsson | | 367/36 |
| 5,477,101 A * | 12/1995 | Ounadjela | | 310/334 |
| 6,474,439 B1 | 11/2002 | Hoyle et al. | | |
| 7,334,661 B2 * | 2/2008 | Pabon et al. | | 181/108 |
| 2005/0087391 A1 * | 4/2005 | Ounadjela | | 181/121 |
| 2009/0321175 A1 * | 12/2009 | Tenghamn | | 181/121 |

* cited by examiner

*Primary Examiner* — Forrest M Phillips
(74) *Attorney, Agent, or Firm* — Jianguang Du; Jody DeStefanis

(57) ABSTRACT

An apparatus disclosed herein includes a shell movably coupled to a base. The shell defines a chamber, and a counterweight is disposed in the chamber. A first spring is coupled to the shell and a first end of the counterweight, and a second spring is coupled to the shell and a second end of the counterweight. The first spring is oriented at a first angle, and the second spring is oriented at a second angle different than the first angle. The example apparatus further includes an actuator coupled to the first spring or the second spring. The actuator is to oscillate the counterweight to enable the shell to provide an acoustic signal.

20 Claims, 5 Drawing Sheets

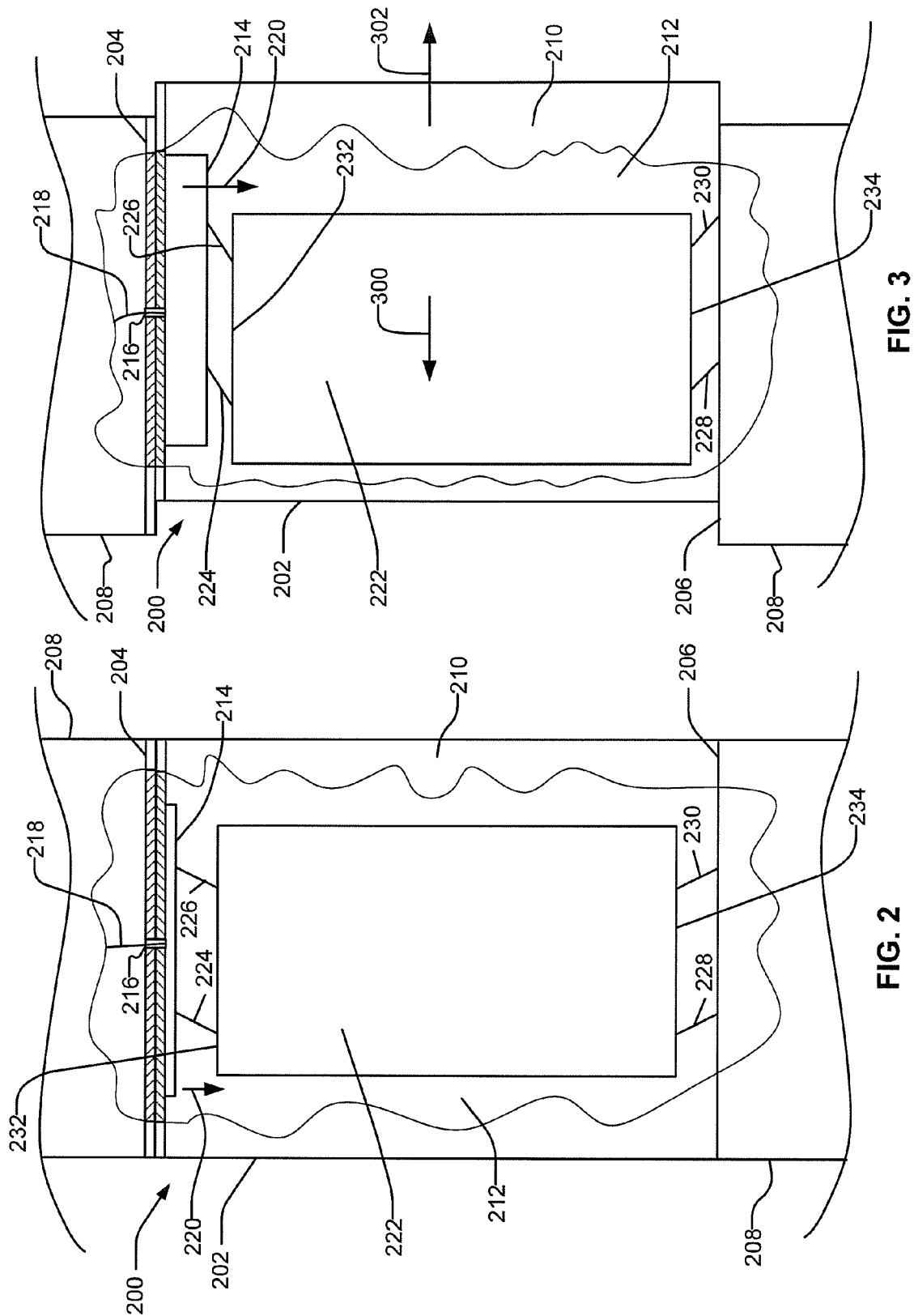

ACOUSTIC SOURCES

BACKGROUND OF THE DISCLOSURE

To evaluate a subterranean formation, a downhole tool may be lowered into a wellbore or borehole penetrating the subterranean formation to measure one or more characteristics or parameters of the subterranean formation such as, for example, formation porosity, formation shear slowness, etc. To acquire data, an acoustic source disposed on the downhole tool generates a signal, which travels through the subterranean formation and returns to the downhole tool.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An example apparatus disclosed herein includes a shell to be movably coupled to a base. The shell defines a chamber, and a counterweight is disposed in the chamber. A first spring is coupled to the shell and a first end of the counterweight, and a second spring is coupled to the shell and a second end of the counterweight. The first spring is oriented at a first angle, and the second spring is oriented at a second angle different than the first angle. The example apparatus further includes an actuator coupled to the first spring or the second spring. The actuator is to oscillate the counterweight to enable the shell to provide an acoustic signal.

Another example apparatus disclosed herein includes a shell to be movably coupled to a base. The shell defines a chamber, and a counterweight is disposed in the chamber. The counterweight has a first end and a second end. Each end of the counterweight is coupled to the shell via a spring. The example apparatus further includes an expandable plate coupled to the shell or the counterweight. Expansion of the plate in a first direction compresses the springs to cause movement of the counterweight in a second direction substantially perpendicular to the first direction. The movement of the counterweight moves the shell to provide an acoustic signal.

Another example apparatus disclosed herein includes a downhole tool including a support extending substantially along a longitudinal axis of a portion of the downhole tool. The example apparatus further includes a shell movably coupled to the downhole tool. The shell defines an exterior surface to be in contact with a fluid, an inner bore, and a chamber between the exterior surface and the inner bore. A counterweight is disposed in the chamber and movably coupled to the shell. The example apparatus also includes an actuator operatively coupled to the counterweight to move the counterweight. The support of the downhole tool extends through the inner bore of the shell and movement of the counterweight is to move the shell relative to the support to provide an acoustic signal via the fluid.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 2 illustrates various components of an example device that can implement embodiments of acoustic sources.

FIG. 3 illustrates various components of the example device of FIG. 2 that can implement embodiments of acoustic sources.

DETAILED DESCRIPTION

Figure 1:
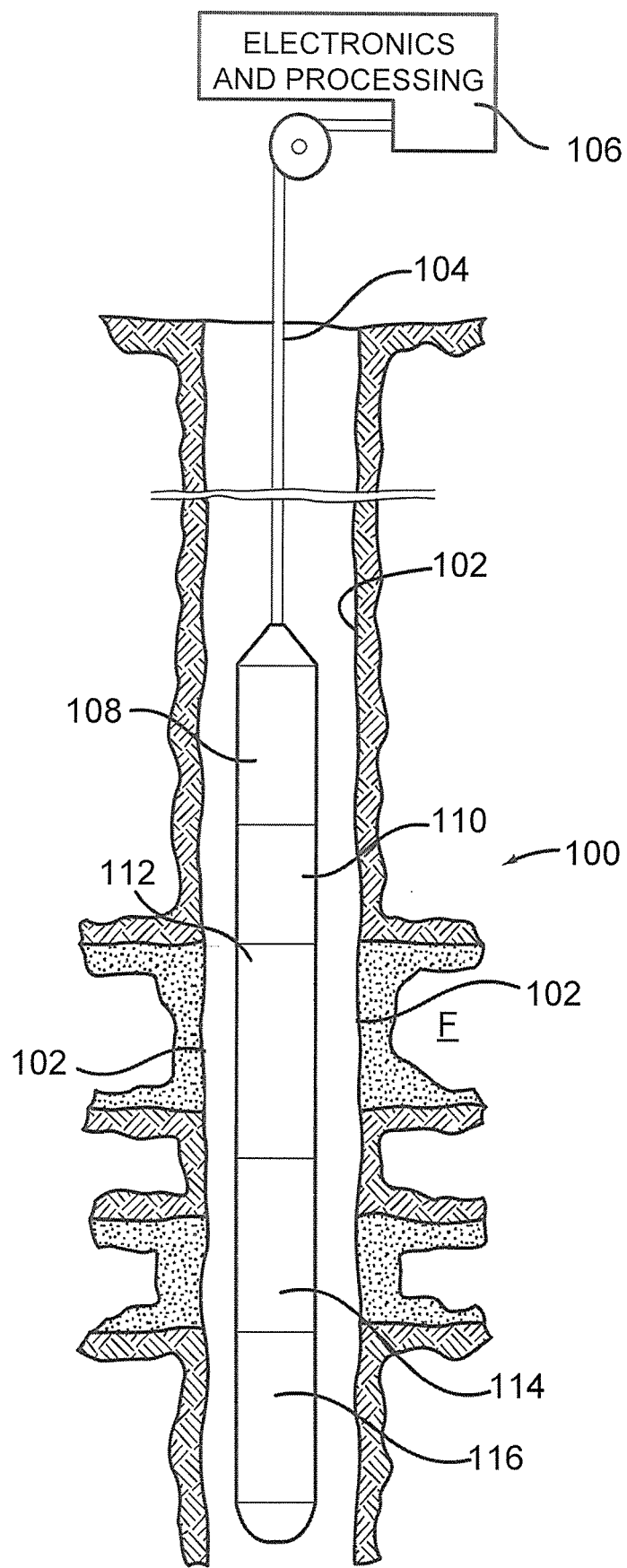
FIG. 1 illustrates another example system in which embodiments of acoustic sources can be implemented.

It is to be understood that the following disclosure provides many different examples for implementing different features of various acoustic sources. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various examples and/or configurations discussed. Moreover, the formation of a first feature over or on a second feature in the description that follows may include examples in which the first and second features are formed in direct contact, and may also include examples in which additional features may be formed interposing the first and second features such that the first and second features may not be in direct contact.

One or more aspects of the present disclosure relate to acoustic sources. An example apparatus disclosed herein may include a shell, which may be oscillated to provide an acoustic signal. For example, the shell may define an exterior surface to be in contact with a fluid and a chamber to be isolated from the fluid. A counterweight may be disposed in the chamber and movably coupled to the shell. In some examples, a first end of the counterweight is coupled to the shell via a first spring, and a second end of the counterweight is coupled to the shell via a second spring. The first spring may be oriented at a first angle, and the second spring may be oriented at a second angle different than the first angle.

An actuator such as, for example, an expandable plate, may be coupled to the first spring or the second spring. To generate an acoustic signal (e.g., a dipole acoustic signal) via the fluid, the actuator may move the counterweight to move the shell. In some examples, the actuator provides a force in a first direction to compress the springs to move the counterweight in a second direction different than the first direction.

The shell may be movably coupled to a base disposed on a downhole tool. In some such examples, the shell may define an inner bore extending substantially along a longitudinal axis of the shell to receive a support extending along the downhole tool, and the shell may move relative to the support.

FIG. 1 depicts an example wireline tool 100 in which aspects of the present disclosure may be implemented. The example wireline tool 100 is suspended in a wellbore 102 from the lower end of a multiconductor cable 104 that is spooled on a winch (not shown) at the Earth's surface. At the surface, the cable 104 is communicatively coupled to an electronics and processing system 106. The example wireline tool 100 includes an elongated body 108 that includes a formation tester 110 having a first acoustic source 112 (e.g., a shaker) and a second acoustic source 114. The example formation tester 110 may be used to determine one of more characteristics (e.g., shear slowness, etc.) of a formation F adjacent the wellbore 102. In the illustrated example, the downhole tool 100 includes one or more modules 116, which may include one or more acoustic receivers.

FIG. 2 illustrates an example shaker 200 disclosed herein that may be employed as one of the example acoustic sources 110 and 112 of FIG. 1. The example shaker 200 includes a shell 202 movably coupled to a first base 204 and a second base 206. The example shell 202 is cylindrical. However, the above-noted shape of the shell 202 is merely an example and, thus, other shapes may be used without departing from the scope of this disclosure. In some examples, the shell 202 is composed of titanium, steel, and/or any other suitable material. In some examples, the first base 204 and the second base 206 are disposed on a downhole tool 208 such as, for example, the downhole tool 100 of FIG. 1. In the illustrated example, the outer diameter of the shell 202 is about the same as an outer diameter of the downhole tool 208. When the example downhole tool 208 is disposed in a wellbore or borehole, an exterior surface 210 of the shell 202 contacts a fluid (e.g., formation fluid, drilling mud, etc.).

The example shell 202 of FIG. 2 defines a chamber 212. In some examples, the chamber 212 is substantially filled with a gas (e.g., air.) In other examples, the chamber 212 is a vacuum chamber. An actuator 214 is disposed in the chamber 212 and coupled to the shell 202 adjacent the first base 204. In the illustrated example, the first base 204 and the shell 202 define a wire feedthrough 216 through which a wire 218 is coupled to the actuator 214.

In some examples, the actuator 214 is a piezoelectric actuator such as, for example, a plate including piezoelectric material (e.g., quartz, lead zirconate titanate (PZT), barium titanate, etc.). In other examples, the actuator 214 is a magnetostrictive actuator such as, for example, a plate including magnetostrictive material (e.g., terfonol-D, cobalt, etc.). When energized (e.g., supplied with an electric current via the wire 218, a magnetic field, etc.), the example actuator 214 moves (e.g., expands, extends, etc.) in a first direction 220. In the illustrated example, the actuator 214 moves toward the second base 206 (i.e., downward in the orientation of FIG. 2). In the illustrated example, the actuator 214 is in an unactuated state.

A counterweight 222 is disposed in the chamber 212 and movably coupled to the shell 202. In some examples, the counterweight 222 is composed of tungsten, steel, and/or any other suitable material. In some examples, a portion of the counterweight 222 is hollow. In other examples, the counterweight 222 is substantially solid. In some examples, a weight of the shell 202 is about the same as a weight of the counterweight 222. In other examples, the weight of the shell 202 is different (e.g., less, greater) than the weight of the counterweight 222. In the illustrated example, the counterweight 222 is in a first position. As described in greater detail below, when the actuator 214 is in an actuated state, the example counterweight 222 moves in a second direction 302 different than the first direction 220 to a second position.

In the illustrated example, the counterweight 222 is movably coupled to the shell 202 via four springs 224, 226, 228 and 230. Other examples include other numbers of springs. The first spring 224 and the second spring 226 are each coupled to the example actuator 214 and a first end 232 of the counterweight 222. The third spring 228 and the fourth spring 230 are each coupled to the shell 202 and a second end 234 of the counterweight 222 opposite the first end 232. In the illustrated example, the springs 224, 226, 228 and 230 are composed of metal (e.g., steel, titanium, etc.) leaf springs. In some examples, the springs 224, 226, 228 and 230 are curved (e.g., bent) when the counterweight 222 is in the first position (e.g., when the actuator 214 is in a substantially unactuated state). In other examples, the springs 224, 226, 228 and 230 are substantially linear when the counterweight 222 is in the first position.

The first spring 224 and the second spring 226 are substantially parallel and oriented at a first angle relative to the longitudinal axis of the shell 202, and the third spring 228 and the fourth spring 230 are substantially parallel and oriented at a second angle different than the first angle relative to the longitudinal axis of the shell 202. In the illustrated example, the first angle is substantially opposite the second angle (i.e., the first angle has a magnitude substantially equal to the second angle measured in opposite directions relative to the longitudinal axis of the shell 202). As described in greater detail below, the example springs 224, 226, 228 and 230 are slanted or angled toward the counterweight 222 toward a direction of movement of the counterweight 222 (e.g., to the left in the orientation of FIG. 2).

FIG. 3 illustrates the example shaker 200 of FIG. 2 when the actuator 214 is the actuated state. In the illustrated example, an electric current is supplied to the example actuator 214 (e.g., PZT plate) via the wire 218 to cause the actuator 214 to move (e.g., expand) in the first direction 220 (e.g., downward in the orientation of FIG. 2). As a result, the example springs 224, 226, 228 and 230 compress (e.g., bend). In the illustrated example, the springs 224, 226, 228 and 230 are angled toward the counterweight 222 toward the second direction 300 (e.g., to the left in the orientation of FIG. 3) different than the first direction 220. When the example springs 224, 226, 228 and 230 are compressed via the actuator 214, the springs 224, 226, 228 and 230 urge the counterweight 222 to move in the second direction 300. Thus, although the example actuator 214 provides a force to the springs 224, 226, 228 and 230 in the first direction 220, the counterweight 222 moves in the second direction 300 different than (e.g., perpendicular to) the first direction 220.

In the illustrated example, the orientation of the first spring 224 and the second spring 226 (e.g., at the first angle) relative to the orientation of the third spring 228 and the fourth spring 230 (e.g., at the second angle opposite the first angle) cause the counterweight 222 to move perpendicular to the longitudinal axis of the shell 202 and, thus, the first direction 220 when the example springs 224, 226, 228 and 230 are compressed. In other examples, the first spring 224 and the second spring 226 are oriented at the second angle, and the third spring 228 and the fourth spring 230 are oriented at the first angle. In such examples, the springs urge the counterweight 222 toward a third direction 302 (e.g., to the right in the orientation of FIG. 3) when the actuator 214 moves from the unactuated state to the actuated state.

In the illustrated example, the springs 224, 226, 228 and 230 amplify the movement of the actuator 214. Thus, the counterweight 222 moves a distance in the second direction 300 greater than a distance moved by the actuator 214 (e.g., corresponding to an amount of expansion) in the first direction 220. In response to the movement of the counterweight 222, the example shell 202 moves relative to the downhole tool 208 in a direction opposite the direction of the movement of the counterweight 222. For example, if the counterweight 222 moves in the second direction 300 (e.g., left in the orientation of FIG. 3) relative to the shell 202, the shell 202 moves in the third direction 302 (e.g., right in the orientation of FIG. 3) relative to the downhole tool 208. In some examples, the amount movement of the shell 202 relative to the downhole tool 208 is about one half of the amount of movement of the counterweight 222 relative to the shell 202. In other examples, the amount movement of the shell 202 relative to the downhole tool 208 is greater than half of the amount of movement of the counterweight 222 relative to the shell 202.

The electric current provided to the example actuator 214 via the wire 218 may be pulsed or fluctuated to actuate and unactuate the actuator 214, thereby causing the example counterweight 222 and shell 202 to oscillate. A frequency of oscillations of the counterweight 222 and, thus, the shell 202 may be controlled via a processor (e.g., the electronics and processing system 106, a downhole controller, and/or any other suitable processor). Thus, the example shaker 200 of FIGS. 2 and 3 may be employed as an acoustic source to provide an acoustic signal (e.g., an acoustic dipole signal) via the fluid. In some examples, the acoustic signal provided by the example shaker 200 of FIGS. 2 and 3 may be used to determine one or more characteristics of a wellbore and/or a subterranean formation.

Figure 4:
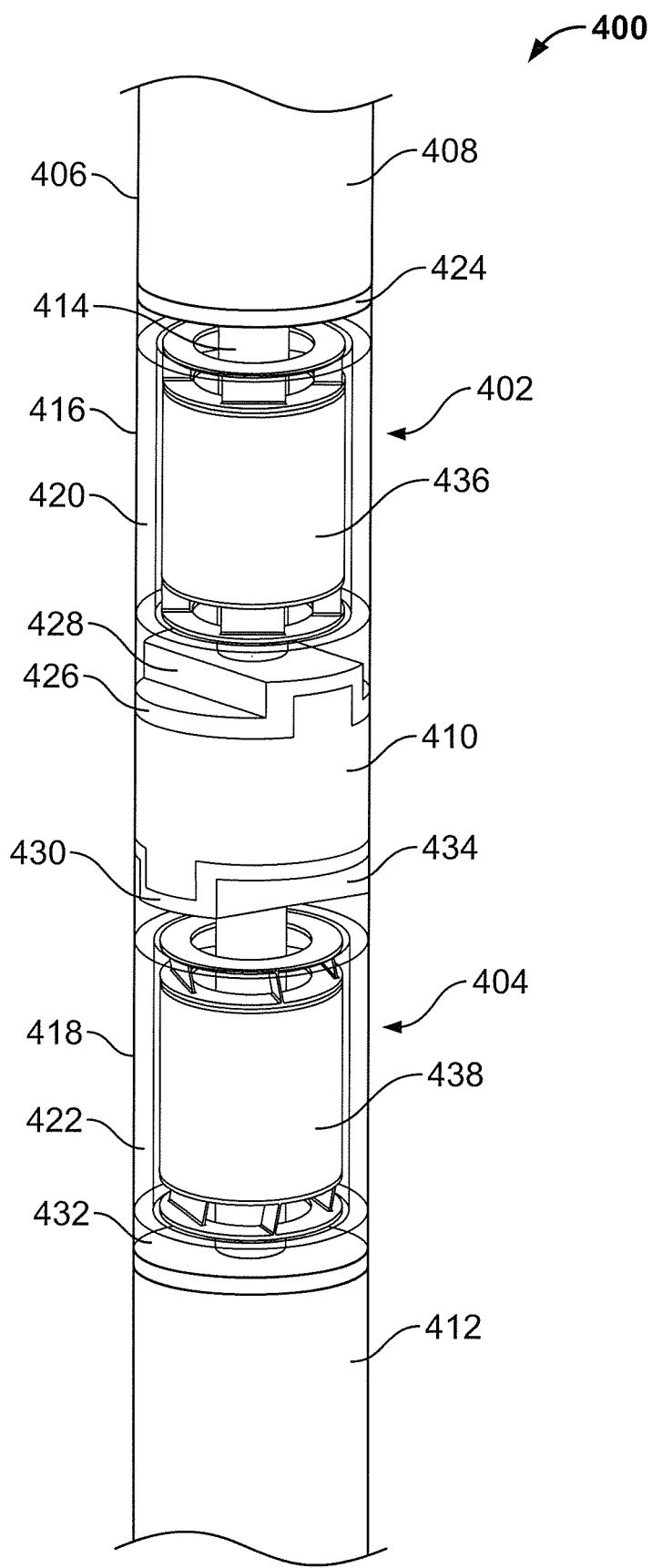
FIG. 4 illustrates various components of another example device that can implement embodiments of acoustic sources.

FIG. 4 is a cutaway view of an example downhole tool 400 including an example first shaker 402 and an example second shaker 404, each of which may be used to generate acoustic signals (e.g., dipole acoustic signals). In some examples, the downhole tool 400 of FIG. 4 is deployed or suspended via a multi-conductor cable. The example downhole tool 400 includes a pipe 406. The example pipe 406 includes a first portion 408, a second portion 410 and a third portion 412. A support 414 (e.g., a tube, a pipe, etc.) is coupled to the first portion 408, the second portion 410 and the third portion 412 of the example pipe 406. In the illustrated example, the support 414 extends through the first shaker 402 and the second shaker 404 substantially along a longitudinal axis of the pipe 406. The example support 414 provides rigidity to the downhole tool 400 and, as described in greater detail below, one or more electrical wires extend through the support 414 to supply electrical power to one or more portions and/or components of the example downhole tool 400.

The example first shaker 402 includes a first shell 416, and the example second shaker 404 includes a second shell 418. When the example downhole tool 400 of FIG. 4 is disposed in a wellbore or a borehole, an exterior surface 420 of the first shell 416 and an exterior surface 422 of the second shell 418 are in contact with a fluid (e.g., formation fluid, drilling mud, etc.). As described in greater detail below, movement (e.g., oscillation) of each of the shakers 402 and 404 may generate an acoustic signal via the fluid. In the illustrated example, the outer diameters of the example shells 416 and 418 are substantially equal to an outer diameter of the pipe 406 (e.g., about 57 millimeters). The first shell 416 is movably coupled to the first portion 408 and the second portion 410 of the pipe 406 via a first base 424 and a second base 426, respectively. In the illustrated example, the second base 426 defines a first guide 428 (e.g., a rail) to substantially confine movement of the first shell 416 to movement along a first axis. In the illustrated example, the first axis is substantially perpendicular to the longitudinal axis of the pipe 406.

The second shell 418 is movably coupled the second portion 410 and the third portion 412 of the example pipe 406 via a third base 430 and a fourth base 432, respectively. The example third base 430 defines a second guide 434 (e.g., a rail) to substantially confine movement of the second shell 418 to movement along a second axis. The example second axis is substantially perpendicular to the longitudinal axis of the pipe 406. In the illustrated example, the first axis is substantially perpendicular to the second axis. Thus, when the first shaker 402 moves along the first axis and the second shaker 404 moves along the second axis, the example first shaker 402 and the example second shaker 404 generate acoustic signals that propagate in substantially perpendicular directions (i.e., along the first axis and the second axis, respectively). In some examples, the shells 416 and 418 are movably coupled to the pipe 406 via thrust joints. In some examples, the acoustic signals (e.g., dipole acoustic signals) are used to determined one or more characteristics of a subterranean formation. As described in greater detail below, a first counterweight 436 and a second counterweight 438 are movably coupled to the first shell 416 and the second shell 418, respectively.

Figure 5:
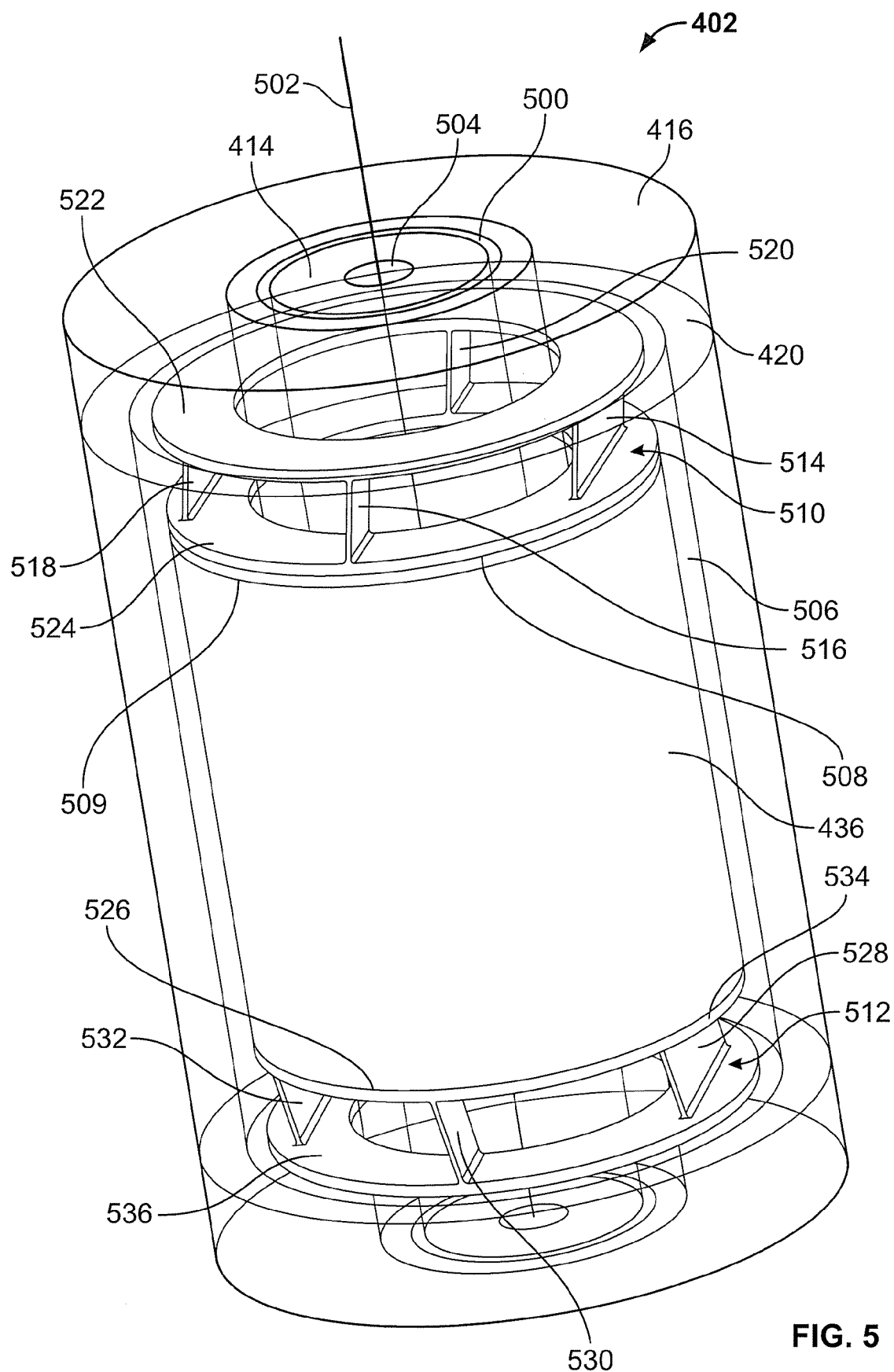
FIG. 5 illustrates various components of the example device of FIG. 4 that can implement embodiments of acoustic sources.

FIG. 5 is a partial cutaway view the example first shaker 402 of FIG. 4. The example first shaker 402 and the example second shaker 404 are substantially identical but oriented in different directions. Therefore, a description of the first shaker 402 is applicable to the second shaker 404 and, to avoid redundancy, the second shaker 404 is not separately described. The example first shell 416 may be composed of titanium, stainless steel, and/or any other suitable material. The first shell 416 defines an aperture 500 extending through the first shell 416 substantially along a longitudinal axis of the first shell 416. In the illustrated example, the aperture 500 is an inner bore having a diameter of about 18 millimeters. However, the above-noted shape and dimension of the aperture 500 are merely examples and, thus, other shapes and dimensions may be used without departing from the scope of this disclosure. The example aperture 500 receives the support 414 and/or provides a path for one or more electrical wires 502. In the illustrated example, the support 414 extends through the first shell 416 via the aperture 500. The example support 414 includes an aperture 504 extending substantially along a longitudinal axis of the support 414, and the electrical wires 502 extend through the support 414 via the aperture 504. The electrical wires 502 are coupled to one or more portions and/or components of the example downhole tool 400 to supply electrical power, transmit data, etc.

The example first shell 416 defines a chamber 506 between the exterior surface 420 and the aperture 500 of the first shell 416. In some examples, the chamber 506 is substantially filled with a gas (e.g., air.) In other examples, the chamber 506 is a vacuum chamber. The first counterweight 436 is disposed in the chamber 506 and movably coupled to the first shell 416. Thus, the example first counterweight 436 is composed of isolated from the fluid. In the illustrated example, the first counterweight 436 is a tube and surrounds the aperture 500 and the support 414. However, the above-noted shape of the first counterweight 436 is merely an example and, thus, other shapes may be used without departing from the scope of this disclosure. In some examples, the first counterweight 436 is tungsten, steel, and/or any other suitable material. In the illustrated example, a weight of the first shell 416 and a weight of the first counterweight 436 are substantially equal. In other examples, the weight of the first shell 416 and the weight of the first counterweight 436 are different (e.g., the weight of the first shell 416 is less than the weight of the first counterweight 436).

In the illustrated example, an actuator 508 is coupled to a first end 509 of the first counterweight 436. The example actuator 508 is a piezoelectric (e.g., quartz, lead zirconate titanate (PZT), barium titanate, etc.) plate, which expands parallel to the longitudinal axis of the first shell 416 when an electric current is provided to the actuator 508. In some examples, the electric current is provided to the example actuator 508 via the wires 502. In other examples, the actuator 508 is a magnetostrictive actuator, which is actuated when a magnetic field is applied to a magnetostrictive material (e.g., terfonol-D, cobalt, etc.) of the actuator 508.

The example shaker 402 of FIG. 5 includes a first suspension 510 and a second suspension 512. The example first suspension 510 is coupled to the actuator 508 and the first shell 416. In the illustrated example, the first suspension 510 includes four leaf springs 514, 516, 518 and 520 disposed between a first seat 522 and a second seat 524. The second suspension 512 is coupled to a second end 526 of the first counterweight 436 and the first shell 416. In the illustrated example, the second suspension 512 includes four leaf springs 528, 530, 532 and 600 (FIG. 6) disposed between a third seat 534 and a fourth seat 536. The springs 514, 516, 518 and 520 of the first suspension 510 are substantially parallel and oriented at a first angle, and the springs 528, 530, 532 and 600 of the second suspension 512 are substantially parallel and oriented at a second angle different than the first angle. In the illustrated example, the first angle is substantially opposite the second angle (i.e., the first angle has a magnitude substantially equal to the second angle measured in opposite directions from the longitudinal axis of the first shell 416). The springs 514, 516, 518 and 520 of the first suspension 510 and the springs 528, 530, 532 and 600 of the second suspension 512 are angled or slanted toward the first counterweight 436 toward a first direction (e.g., along the first axis). Thus, when the springs 514, 516, 518 and 520 of the first suspension 510 and the springs 528, 530, 532 and 600 of the second suspension 512 are compressed via the actuator 508, the first suspension 510 and the second suspension 512 urge the first counterweight 436 toward the first direction. In the illustrated example, the first direction is substantially perpendicular to the longitudinal axis of the first shell 416.

In other examples, the springs 514, 516, 518 and 520 of the first suspension 510 are oriented at the second angle and the springs 528, 530, 532 and 600 of the second suspension 512 are oriented at the first angle. In such examples, the first suspension 510 and the second suspension 512 urge the first counterweight 436 toward a second direction opposite the first direction when the actuator 508 moves from an unactuated state to an actuated state. In some examples, when the actuator 508 is in the unactuated state (as shown in FIG. 5), the springs 514, 516, 518, 520, 528, 530, 532 and 600 are curved. In other examples, when the actuator 508 is in the unactuated state, the springs 514, 516, 518, 520, 528, 530, 532 and 600 are substantially linear. The example springs 514, 516, 518, 520, 528, 530, 532 and 600 may be composed of titanium, steel, and/or any other suitable material.

Figure 6:
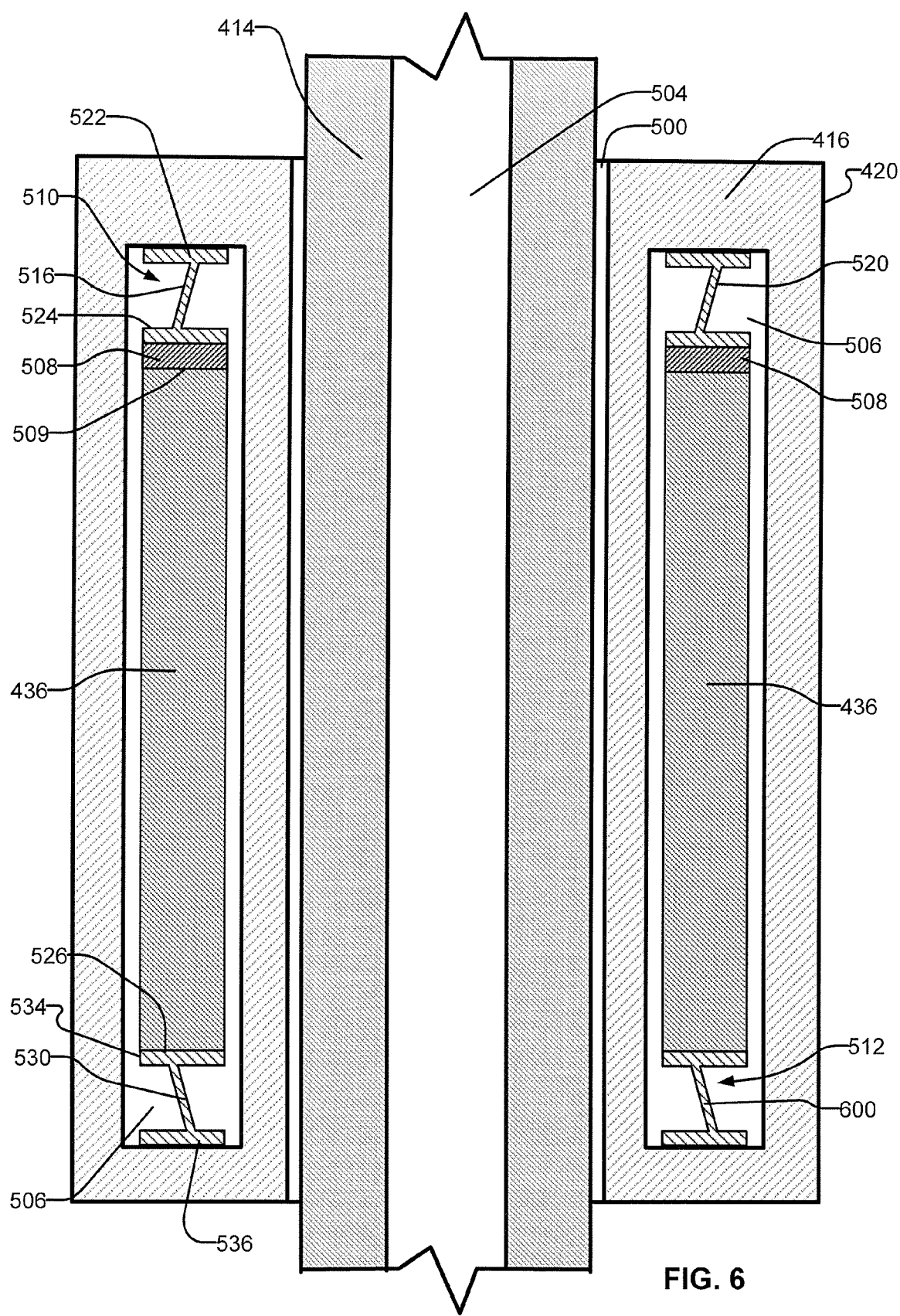
FIG. 6 illustrates various components of the example device of FIG. 5 that can implement embodiments of acoustic sources.

FIG. 6 is a cross-sectional view of the example shaker 402 of FIG. 5. When the example actuator 508 (e.g., PZT plate) is energized (e.g., provided with an electric current, magnetic field, etc.), the actuator 508 moves (e.g., expands, extends, etc.) substantially parallel to the longitudinal axis of the first shell 416. As a result, the example springs 514, 516, 518, 520, 528, 530, 532 and 600 compress (e.g., bend), thereby urging the example first counterweight 436 to move relative to the first shell 416 in the first direction (e.g., to the left in the orientation of FIG. 6). In the illustrated example, the orientation of the springs 514, 516, 518 and 520 of the first suspension 510 (e.g., at the first angle) relative to the orientation of the springs 528, 530, 532 and 600 of the second suspension 512 (e.g., at the second angle opposite the first angle) cause the first counterweight 436 to move perpendicular to the longitudinal axis of the first shell 416 in the first direction when the actuator 508 moves from the unactuated state to the actuated state. Thus, although the example actuator 508 provides a force parallel to the longitudinal axis of the shell 416 to compress the springs 514, 516, 518, 520, 528, 530, 532 and 600, the example first counterweight 436 moves perpendicular to the longitudinal axis of the shell 416.

In other examples, the springs 514, 516, 518 and 520 of the first suspension 510 are oriented at the second angle and the springs 528, 530, 532 and 600 of the second suspension 512 are oriented at the first angle. In such examples, the springs 514, 516, 518, 520, 528, 530, 532 and 600 urge the first counterweight 436 toward a second direction (e.g., to the right in the orientation of FIG. 6) when the actuator 508 moves from the unactuated state to the actuated state.

In the illustrated example, the springs 514, 516, 518, 520, 528, 530, 532 and 600 amplify the movement of the actuator 508. Thus, the first counterweight 436 moves a distance in the first direction greater than a distance moved by the actuator 508 (e.g., corresponding to an amount of expansion). In some examples, the first counterweight 436 moves about 0.01 millimeters when the actuator 508 moves from the unactuated state to the actuated state.

In response to the movement of the first counterweight 436, the example first shell 416 moves relative to the support 414 in a direction opposite the direction of the movement of the first counterweight 436. For example, if the first counterweight 436 moves relative to the first shell 416 in the first direction (e.g., left in the orientation of FIG. 6), the first shell 416 moves relative to the support 414 in the second direction (e.g., right in the orientation of FIG. 6). In some examples, the amount movement of the first shell 416 relative to the support 414 is about one half of the amount of movement of the first counterweight 436 relative to the first shell 416. In other examples, the amount movement of the first shell 416 relative to the support 414 is greater than half of the amount of movement of the first counterweight 436 relative to the first shell 416.

The electric current provided to the example actuator 508 may be pulsed or fluctuated to actuate and unactuate the actuator 508, thereby causing the example first counterweight 436 and first shell 416 to oscillate. A frequency of oscillations of the first counterweight 436 and, thus, the first shell 416 may be controlled via a processor (e.g., the electronics and processing system 306 of FIG. 1, a downhole controller, and/or any other suitable processor). Thus, the example first shaker 402 and the example second shaker 404 of FIGS. 4-6 may each be employed as an acoustic source to provide an acoustic signal (e.g., an acoustic dipole signal). In some examples, the acoustic signal provided by one or both of the example shakers 402 and 404 of FIGS. 4-6 may be used to determine one or more characteristics of a wellbore and/or a subterranean formation.

Although only a few examples have been described in detail above, those skilled in the art will readily appreciate that many modifications are possible in the examples without materially departing from this disclosure. Accordingly, such modifications are intended to be included within the scope of this disclosure as defined in the following claims. In the claims, means-plus-function clauses are intended to cover the structures described herein as performing the recited function and not only as structural equivalents, but also equivalent structures. Thus, although a nail and a screw may be not structural equivalents in that a nail employs a cylindrical surface to secured wooden parts together, whereas a screw employs a helical surface, in the environment of fastening wooden parts, a nail and a screw may be equivalent structures. It is the express intent of the applicant not to invoke 35 U.S.C. §112, paragraph 6 for any limitations of any of the claims herein, except for those in which the claim expressly uses the words "means for" together with an associated function.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. An apparatus, comprising:
a shell to be movably coupled to a base, the shell defining a chamber;
a counterweight disposed in the chamber, the counterweight having a longitudinal axis extending between a first end and a second end;
a first spring coupled to the shell and the first end of the counterweight, the first spring oriented at a first angle;
a second spring coupled to the shell and the second end of the counterweight, the second spring oriented at a second angle different than the first angle; and
an actuator coupled to one of the first spring or the second spring, wherein the actuator oscillates the counterweight in a direction perpendicular to the longitudinal axis of the counterweight to enable the shell to provide an acoustic signal.

2. The apparatus of claim 1 wherein the shell defines an aperture extending through the shell to provide a path for one or more electrical wires, the aperture oriented substantially along a longitudinal axis of the shell.

3. The apparatus of claim 1 wherein the shell defines an aperture extending through the shell to receive a support, the aperture oriented substantially along a longitudinal axis of the shell.

4. The apparatus of claim 1 wherein the actuator is coupled to the counterweight.

5. The apparatus of claim 1 wherein the actuator is coupled to the shell.

6. The apparatus of claim 1 wherein the actuator is a piezoelectric or magnetostrictive actuator.

7. The apparatus of claim 1 wherein the first spring and the second spring are angled from the shell toward a direction of movement of the counterweight.

8. The apparatus of claim 1 further comprising the base and wherein the base is disposed on a downhole tool.

9. An apparatus, comprising:
a shell to be movably coupled to a base, the shell defining a chamber;
a counterweight disposed in the chamber, the counterweight having a longitudinal axis extending between a first end and a second end, each end coupled to the shell via one or more springs; and
an expandable plate coupled to one of the shell or the counterweight, wherein expansion of the plate in a first direction is to compress the springs to cause movement of the counterweight in a second direction substantially perpendicular to the longitudinal axis of the counterweight, the movement of the counterweight to move the shell in a direction opposite to the movement of the counterweight to provide an acoustic signal.

10. The apparatus of claim 9 wherein the chamber is disposed between an exterior surface of the shell and an aperture extending through the shell substantially along a longitudinal axis of the shell.

11. The apparatus of claim 10 wherein a support is to extend through the aperture.

12. The apparatus of claim 9 wherein the one or more springs coupled to the first end of the counterweight are oriented at a first angle and the one or more springs coupled to the second end of the counterweight are oriented at a second angle substantially opposite the first angle.

13. The apparatus of claim 9 wherein the expandable plate is piezoelectric or magnetostrictive.

14. The apparatus of claim 9 wherein the springs are angled toward the counterweight toward the second direction.

15. The apparatus of claim 9 further comprising the base and wherein the base is disposed on a downhole tool.

16. An apparatus, comprising:
a downhole tool including a support extending substantially along a longitudinal axis of at least a portion of the downhole tool;
a shell movably coupled to the downhole tool, the shell defining an exterior surface to be in contact with a fluid, an inner bore, and a chamber between the exterior surface and the inner bore;
a counterweight disposed in the chamber and movably coupled to the shell, the counterweight having a longitudinal axis extending between a first end and a second end of the counterweight; and
an actuator operatively coupled to the counterweight to move the counterweight in a direction perpendicular to the longitudinal axis of the counterweight, wherein the support of the downhole tool extends through the inner bore of the shell and movement of the counterweight is to move the shell relative to the support to provide an acoustic signal via the fluid.

17. The apparatus of claim 16 wherein the first end of the counterweight is movably coupled to the shell via a first spring, and the second end of the counterweight is movably coupled to the shell via a second spring.

18. The apparatus of claim 17 wherein the first spring is oriented at a first angle and the second spring is oriented at a second angle substantially opposite the first angle.

19. The apparatus of claim 16 wherein the actuator provides a force in a first direction to move the counterweight in a second direction different than the first direction.

20. The apparatus of claim 16 wherein the actuator is a piezoelectric or magnetostrictive actuator.

* * * * *